(12) United States Patent
Khera et al.

(10) Patent No.: US 8,548,325 B2
(45) Date of Patent: Oct. 1, 2013

(54) SYSTEM, DEVICE, AND METHOD FOR SUPPORTING CUT-THROUGH PATHS IN AN OPTICAL COMMUNICATION SYSTEM

(75) Inventors: Gautam Khera, Chelmsford, MA (US); Leigh C. McLellan, Framingham, MA (US)

(73) Assignee: Ciena Corporation, Hanover, MD (US)

(*) Notice: Subject to any disclaimer, the term of this patent is extended or adjusted under 35 U.S.C. 154(b) by 213 days.

(21) Appl. No.: 12/837,657

(22) Filed: Jul. 16, 2010

(65) Prior Publication Data

US 2010/0278540 A1    Nov. 4, 2010

Related U.S. Application Data

(60) Continuation-in-part of application No. 11/532,974, filed on Sep. 19, 2006, now Pat. No. 7,773,878, which is a division of application No. 09/952,828, filed on Sep. 14, 2001, now Pat. No. 7,127,180.

(51) Int. Cl.
  *H04J 14/00* (2006.01)
  *H04B 17/00* (2006.01)
  *H04L 12/28* (2006.01)

(52) U.S. Cl.
  USPC ........... 398/57; 398/25; 370/351; 370/395.21

(58) Field of Classification Search
  USPC ............. 398/25, 45, 56, 57; 370/351, 395.21
  See application file for complete search history.

(56) References Cited

U.S. PATENT DOCUMENTS

| | | | |
|---|---|---|---|
| 6,130,889 A * | 10/2000 | Feldman et al. | 370/397 |
| 6,252,857 B1 | 6/2001 | Fendick et al. | |
| 6,898,200 B1 * | 5/2005 | Luciani | 370/352 |
| 6,912,221 B1 | 6/2005 | Zadikian et al. | |
| 6,944,675 B2 | 9/2005 | Fujita | |
| 7,554,971 B2 * | 6/2009 | Smith et al. | 370/352 |
| 7,773,878 B2 * | 8/2010 | Khera et al. | 398/57 |
| 2005/0201380 A1 | 9/2005 | Saleh et al. | |

OTHER PUBLICATIONS

Hierarchical design of WDM optical networks for ATM transport; Jagannath et al.; Global Telecommunications Conference, 1995. GLOBECOM '95, IEEE; vol. 3, Nov. 13-17, 1995, pp. 2188-2194.*
Luciani et al.; NBMA Next Hop Resolution Protocol (NHRP); Network Working Group: RFC 2332; Apr. 1998 [online], [retrieved on Oct. 12, 2012]. Retrieved from the Internet <URL: http://tools.ietf.org/html/rfc2332>.*

(Continued)

*Primary Examiner* — Nathan Curs
(74) *Attorney, Agent, or Firm* — Muncy, Geissler, Olds & Lowe, PLLC

(57) ABSTRACT

A system, device, and method for supporting cut-through pats in an optical communication system involves obtaining hop count and quality of service information by an initiating device and using the hop count and quality of service information by the initiating device to make decisions relating to a cut-through path. The hop count and quality of service information is provided in a reply message that is sent by a terminating device and modified by intermediate devices between the initiating device and the terminating device. The terminating device sends the reply with a hop count equal to one and quality of service information for a first link (hop) toward the initiating device. Each intermediate device increments the hop count in the reply and adds quality of service information for a next link (hop) into the reply.

11 Claims, 7 Drawing Sheets

(56) References Cited

OTHER PUBLICATIONS

Jagannath et al., "Hierarchical Design of WDM Optical Networks for ATM Transport"; Global Telecommunications Conference, 1995. Globecom '95, IEEE; vol. 3, Nov. 13-17, 1995, pp. 2188-2194.

Chandhok et al., "IP over Optical Networks: A Summary of Issues"; Jul. 2000; http://www.cse.ohio-state.edu/~jain/ietf/ftp/draft-osu-ipo-mpls-issues-00.pdf.

Katz et al., "NBMA Next Hop Resolution Protocol (NHRP)"; May 1995; http://mirrors.isc.org/pub/www.watersprings.org/pub/id/draft-ietf-rolc-nhrp-ow.txt.

Luciani, et al., "NBMA Hop Resolution Protocol (NHRP)" Network Working Group Request for Comments: 2332 Category: Standards Track, RFC 2332, Apr. 1998, http://www.faqs.org/rfcs/rfc2332.html. Apr. 1998.

* cited by examiner

SYSTEM, DEVICE, AND METHOD FOR SUPPORTING CUT-THROUGH PATHS IN AN OPTICAL COMMUNICATION SYSTEM

CROSS-REFERENCE TO RELATED APPLICATION

This application is a continuation-in-part of U.S. patent application Ser. No. 11/532,974, filed Sep. 19, 2006 now U.S. Pat. No. 7,773,878, entitled SYSTEM, DEVICE, AND METHOD FOR SUPPORTING CUT-THROUGH PATHS IN AN OPTICAL COMMUNICATION SYSTEM, which is a divisional of U.S. patent application Ser. No. 09/952,828, filed Sep. 14, 2001, now U.S. Pat. No. 7,127,180, the entirety all of which are incorporated herein by reference.

STATEMENT REGARDING FEDERALLY SPONSORED RESEARCH OR DEVELOPMENT n/a

FIELD OF THE INVENTION

The present invention relates generally to optical networking, and more particularly to establishing cut-through paths in an optical communication system.

BACKGROUND OF THE INVENTION

In today's information age, communication networks are increasingly used for transferring information among a multitude of communication devices. As demand for communication services continues to grow the demand on these communication networks for carrying increasing amounts of information at increasing speeds continues to grow. Therefore, communication networks are evolving to handle these increased demands.

One way in which communication networks are evolving is through the use of optical communication facilities. Optical communication facilities transport information over optical communication media (such as optical fibers). Such optical communication networks provide vast amounts of bandwidth over short and long distances.

The optical communication network is capable of providing various communication services to its users. Traditionally, such communication services have been very expensive, and need to be planed and scheduled well in advance. This is due in part because changes to the optical communication network, such as provisioning and switching optical communication paths required substantial human intervention.

As optical communication networks evolve, more intelligence is being built into the control plane of the optical network. This intelligence allows the optical network to support mesh backbone topology and real-time provisioning of optical channel paths, (lightpaths). Furthermore, is intelligence allows various value-added services to be provided from the optical network.

SUMMARY OF THE INVENTION

In accordance with one aspect of the invention, an initiating device obtains hop count and quality of service information and uses the hop count and quality of service information to make decisions relating to a cut-through path. The hop count and quality of service information is provided in a reply message that is sent by a terminating device and modified by intermediate devices between the initiating device and the terminating device. The terminating device sends the reply with a hop count equal to one and quality of service information for a first link (hop) toward the initiating device. Each intermediate device increments the hop count in the reply and adds quality of service information for a next link (hop) into the reply.

One embodiment is a method for supporting cut-through paths in an optical system using a communication protocol. The method includes transmitting a protocol message. The protocol message may include a hop count extension for transporting hop count information over a communication path. The protocol message may also include a quality of service extension for transporting quality of service information associated with each of a plurality of links inserted in the quality of service extension at each hop encountered in a communication path.

The hop count and quality of service information may be transported to the initiating device in a Next Hop Resolution Protocol (NHRP) reply in the form of a hop count type-length-value (TLV) field and a number of quality of service type-length-value (TLV) fields.

The initiating device may include an optical service agent for obtaining the hop count and quality of service information and for using the hop count and quality of service information to make decisions relating to a cut-through path.

Another embodiment is a computer readable non-transitory storage medium for storing a transmission protocol message. The transmission protocol message includes a hop count extension for transporting hop count information over a communication path. The transmission protocol message also includes a quality of service extension for transporting quality of service information associated with each of a plurality of links inserted in the quality of service extension at each hop encountered in a communication path

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

In an embodiment of the present invention, cut-through paths are supported as a value-added service in an intelligent optical network. A cut-through path is essentially a direct optical channel path between two optical network devices. For convenience, the optical network device that initiates the cut-through path is referred to hereinafter as the "initiating" device, and the optical network device at which the cut-through path terminates is referred to hereinafter as the "terminating" device. There may be a number of intermediate devices between the initiating device and the terminating device. The cut-through path can be established to bypass or avoid unnecessary router links (hops) along a routed path between an initiating router and a terminating router.

In order to establish a cut-through path, the various optical network devices along the routed path exchange certain types of information using a predetermined protocol. One such protocol is known as the Next Hop Resolution Protocol (NHRP), which is described in Internet Engineering Task Force (IETF) Request For Comments (RFC) 2322 entitled NDMA Next Hop Resolution Protocol (NHRP) dated April 1998, hereby incorporated herein by reference in its entirety. NHRP provides a mechanism to set up a lightpath for the overlay router network on an optical network "cloud." Using the standard NHRP protocol, the initiating router sends an NHRP request to the terminating router, and receives an address mapping in an NHRP reply. The initiating router uses the address mapping to establish the cut-through path to the terminating router.

Unfortunately, the standard NHRP protocol does not provide any way for the initiating router to evaluate the cut-through path prior to establishing the cut-through path. For example, the initiating router has no way to evaluate the quality of the routed path being bypassed, the number of links in the routed path being bypassed, or the quality of service provided by the routed path being bypassed. Thus, for example, the initiating router could establish a cut-through path that provides little, if any, benefit over the routed path it bypasses.

Therefore, in an embodiment of the present invention, the initiating router obtains additional information prior to establishing the cut-through path. The additional information preferably includes, among other things, hop count information indicating the number of router links (hops) between the initiating router and the terminating router and quality of service (QoS) information indicating quality of service parameters for each router link (hop) between the initiating router and the terminating router. The additional information is provided by the terminating router and/or various intermediate devices along the optical channel path. These intermediate devices are referred to in the NHRP standard as transit Next Hop Servers (NHS).

Figure 1:
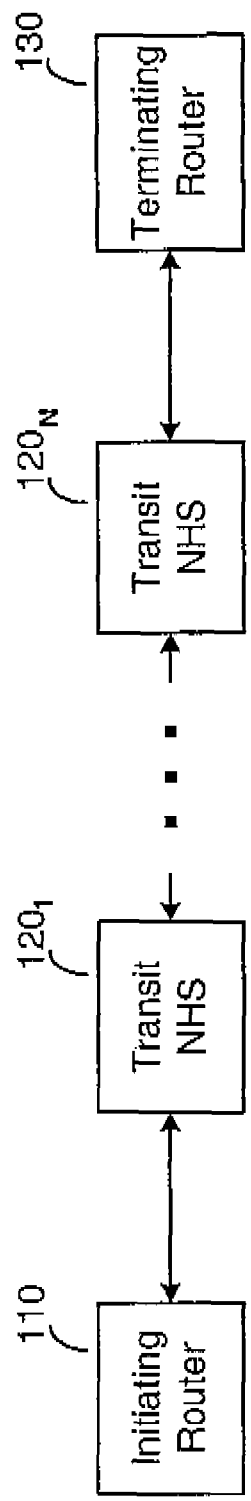
FIG. 1 is a network diagram showing an exemplary optical communication system in accordance with an embodiment of the present invention.

FIG. 1 is a network diagram showing an exemplary optical communication system 100. The optical communication system includes, among other things, an initiating router 110, a number of transit NHSs 120.sub.1-120.sub.N, and a terminating router 130. For purposes of the following discussion, a particular device is said to be "downstream" from another device if it is closer to the terminating router 130 and is said to be "upstream" from the other device if it is closer to the initiating router 110.

In order to transport the hop count and QoS information within NHRP messages, two new Type-Length-Value (TLV) extensions are defined. A TLV extension includes, among other things, a type field indicating the type of TLV, a length field indicating the length in octets of the value field (i.e., not including the type and length fields), and a value field containing the information.

Figure 2:
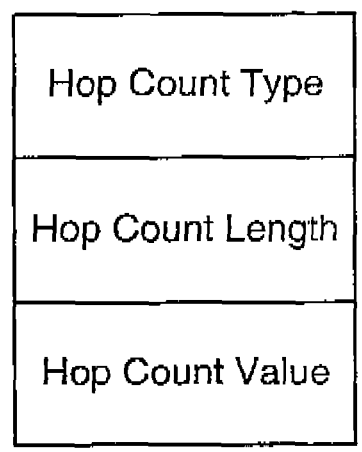
FIG. 2 is a block diagram showing the relevant fields of a hop count type length-value extension in accordance with an embodiment of the present invention.

FIG. 2 is a block diagram showing the relevant fields of an exemplary hop count TLV 200 in accordance with an embodiment of the present invention. Among other things, the hop count TLV 200 includes a hop count type 210, a hop count length 220, and a hop count value 230. The hop count value 230 is typically one octet in length, and therefore the hop count length 220 is typically equal to one. The hop count type 210 is selected from a pool of unused type values for NHRP extensions.

Figure 3:
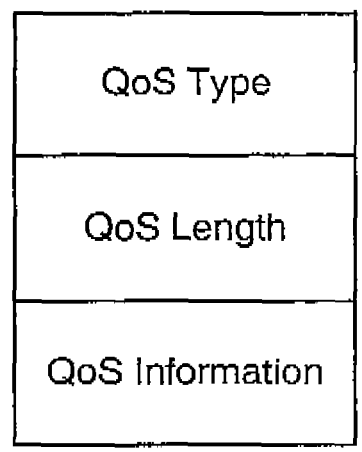
FIG. 3 is a block diagram showing the relevant fields of a quality of service type-length-value extension in accordance with an embodiment of the present invention.

FIG. 3 is a block diagram showing the relevant fields of an exemplary QoS TLV 300 in accordance with an embodiment of the present invention. Among other things, the QoS TLV 300 includes a QoS type 310, a QoS length 320, and QoS information 330. The QoS information 330 may include different types of information for different types of links, and therefore the QoS length may vary. The QoS type 310 is selected from a pool of unused type values for NHRP extensions.

In an embodiment of the present invention, the initiating router 110 sends an NHRP request to the terminating router 130 over the routed path. The NHRP request preferably includes a hop count TLV 200 and a QoS TLV 300. The inclusion of the hop count and QoS TLVs in the NHRP request indicate to the terminating router 130 that the initiating router 110 is expecting to receive hop count and QoS information, and otherwise transport no hop count and QoS information to the terminating router.

Upon receiving the NHRP request from the initiating router preferably including the hop count and QoS TLVs, the terminating router 130 sends an NHRP reply including a hop count TLV 200 and a QoS TLV 300. The terminating router 130 preferably sets the hop count value 230 in the hop count TLV 200 equal to one, and includes QoS information 330 for the next link (hop) in the QoS TLV 300 (i.e., QoS information for the link to its upstream neighbor).

Each transit NHS 120 along the routed path from the terminating router 130 to the initiating router 110 receives the NHRP reply from its downstream neighbor. Each transit NHS 120 preferably increments the hop count value 230 in the hop count TLV 200, and also preferably adds a QoS TLV 300 including QoS information 330 for the next link (hop) after any other QoS TLVs in the NHRP reply.

Figure 4:
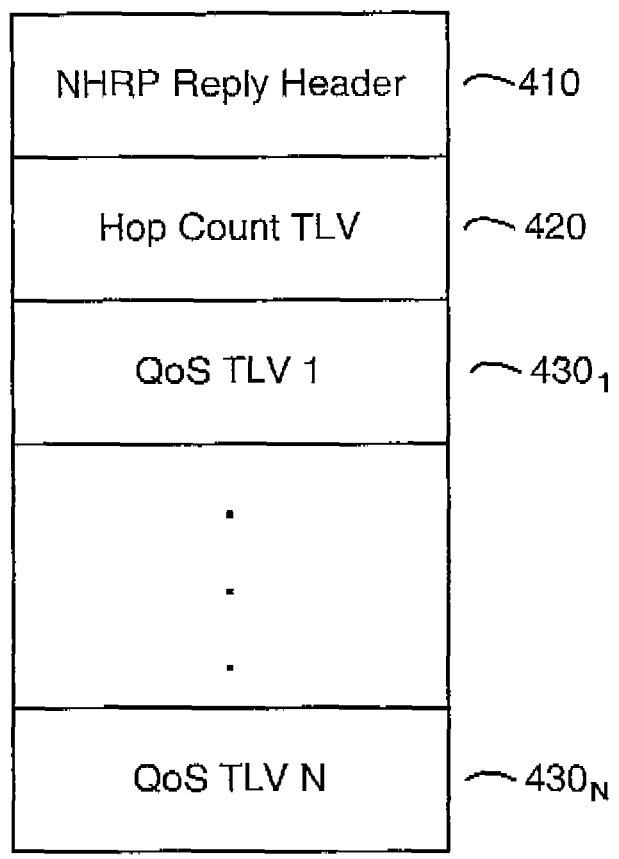
FIG. 4 is a block diagram showing the format of an exemplary Next Hop Resolution Protocol (NHRP) reply including a hop count extension and a number of quality of service extensions in accordance with an embodiment of the present invention.

Thus, the initiating router 110 receives an NHRP reply 400 including an NHRP reply header 410, a hop count TLV 420 indicating the number of links (hops) to the terminating router 130, and a number of QoS TLVs 430.sub.1-430.sub.N, one for each link (hop), as shown in FIG. 4. The initiating router 110 uses the hop count and QoS information from the NHRP reply 400 to make certain decisions regarding the cut-through path, such as the QoS parameters for a cut-through path or even whether or not to establish the cut through path at all. Thus, for example, a decision whether to establish an alternate cut through path may depend upon the hop count and the quality of service information. In this respect the initiating router 110 uses the hop count and QoS information to provide a value-added service in support of cut-through paths.

Figure 5:
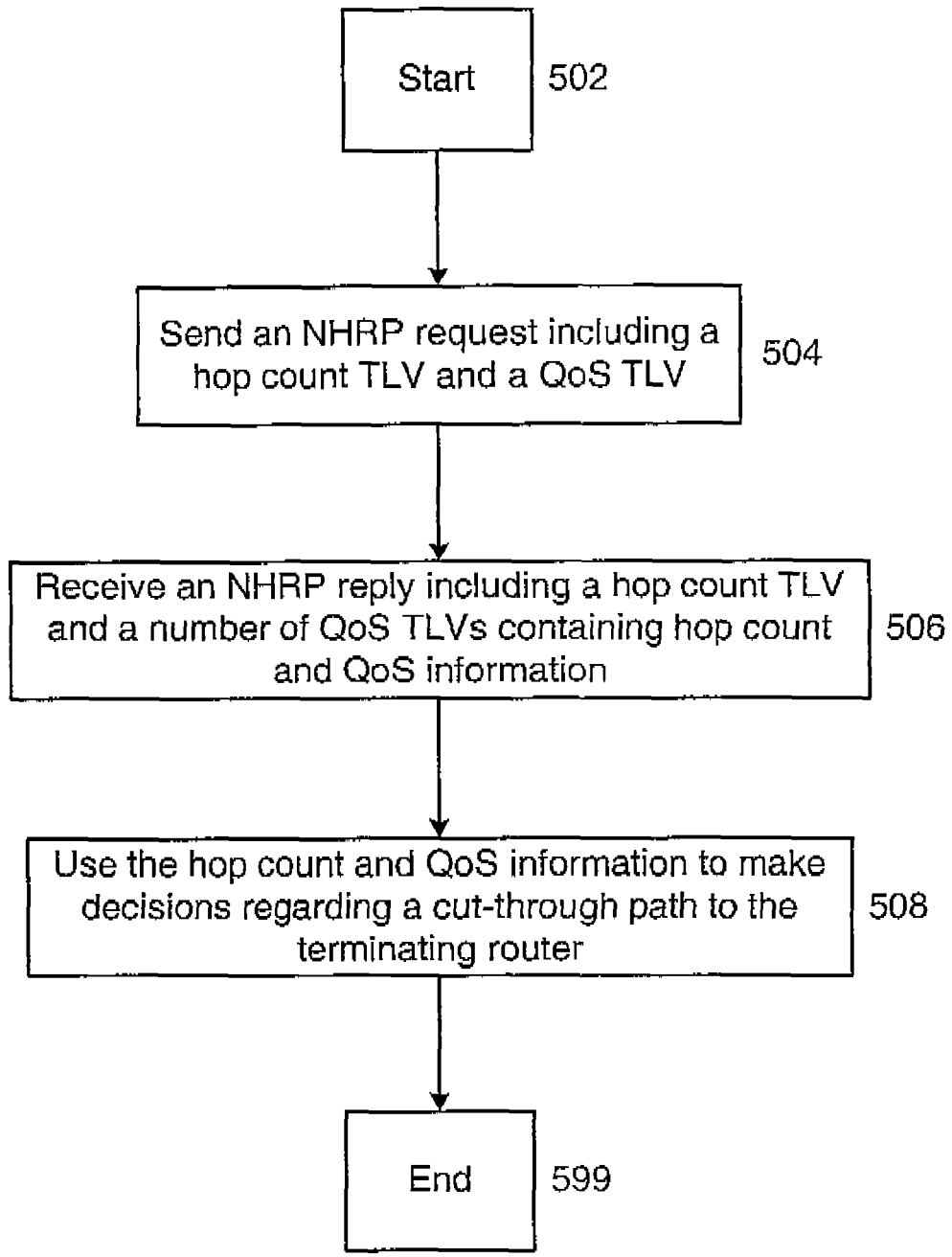
FIG. 5 is a logic flow diagram showing exemplary initiating device logic for supporting cut-through paths in accordance with an embodiment of the present invention.

FIG. 5 is a logic flow diagram showing exemplary initiating router logic 500 for supporting cut-through paths. Beginning at block 502, the logic sends an NHRP request including a hop count TLV and a QoS TLV, in block 504. Upon receiving an NHRP reply including a hop count TLV and a number of QoS TLVs containing hop count and QoS information, in block 506, the logic uses the hop count and QoS information to make decisions regarding a cut-through path to the terminating router, in block 508. The logic 500 terminates in block 599.

Figure 6:
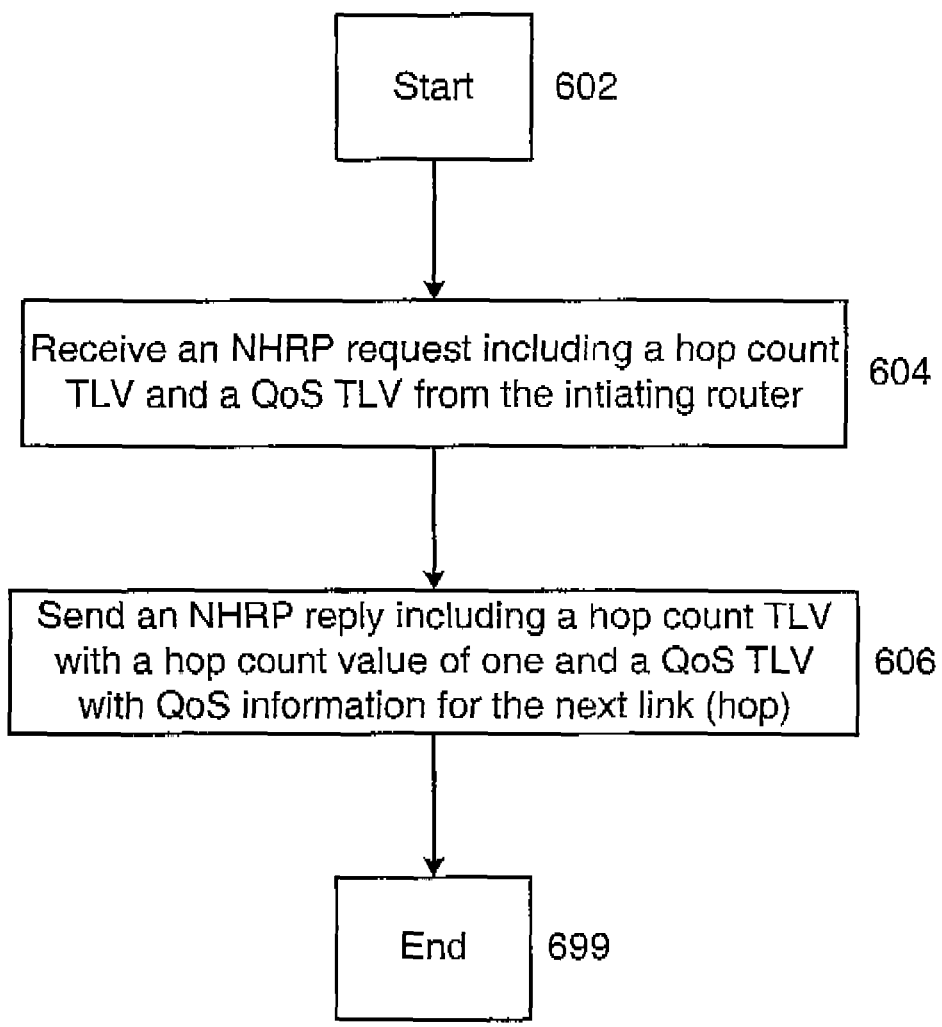
FIG. 6 is a logic flow diagram showing exemplary terminating device logic for supporting cut-through paths in accordance with an embodiment of the present invention.

FIG. 6 is a logic flow diagram showing exemplary terminating router logic 600 for supporting cut-trough paths. Beginning at block 602, the logic receives an NHRP request including a hop count TLV and a QoS TLV from the initiating router, in block 604. The logic sends an NHRP reply including a hop count TLV with a hop count value of one and a QoS TLV with QoS information for the next link (hop), in block 606. The logic 600 terminates in block 699.

Figure 7:
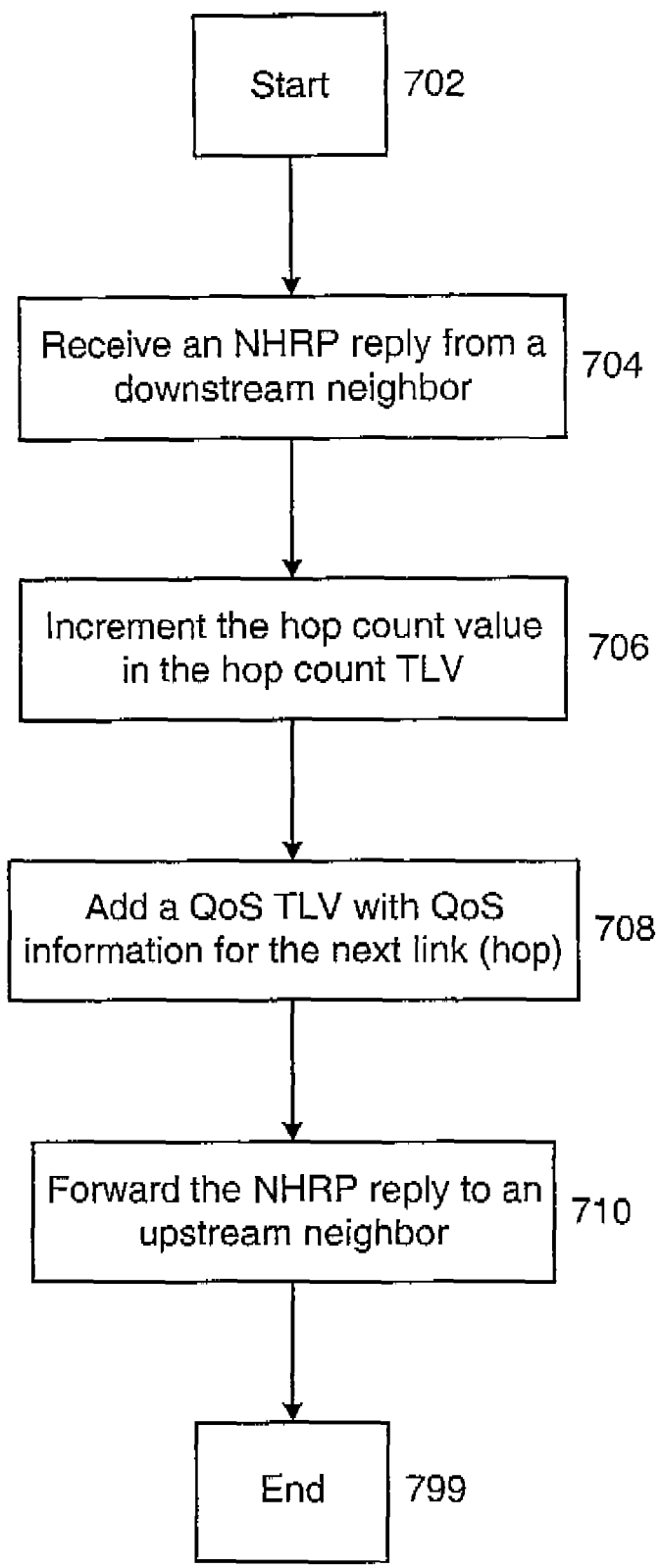
FIG. 7 is a logic flow diagram showing exemplary transmit NHS logic for supporting cut-though paths in accordance with an embodiment of the present invention.

FIG. 7 is a logic flow diagram showing exemplary transit NHS logic 700 for supporting cut-through paths. Beginning at block 702, the logic receives an NHRP reply from a downstream neighbor, in block 704. The logic increments the hop count value in the hop count TLV, in block 706, and adds a QoS TLV with QoS information for the next link (hop), in block 708. The logic forwards the NHRP to an upstream neighbor, in block 710. The logic 700, terminates in block 799.

In an exemplary embodiment of the present invention, the described mechanisms for supporting cut-through paths in an optical communication system are implemented in the context of an automatically switched optical network (ASON), as described in the related application entitled SYSTEM, DEVICE, AND METHOD FOR MANAGING COMMUNICATION SERVICES IN AN OPTICAL COMMUNICATION SYSTEM, which was incorporated by reference above. Specifically, an optical service agent (OSA) in the initiating router may send the NHRP request, receive the NHRP reply including the hop count and QoS information, and use the hop count and QoS information to provide value-added services relating to cut-through pats. Various devices within the ASON and/or the user end-systems act as transit NHSs to increment the hop count and add QoS TLVs to the NHRP reply on its way upstream from the terminating router toward the initiating router. The terminating router may be within the ASON or within a user end-system attached to the ASON.

It should be noted that the present invention is in no way limited to the use of NHRP either with or without the described modifications, to the use of hop count and QoS TLVs as described, or to any particular protocols, protocol messages, or protocol extensions.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the logic flow diagrams are used herein to demonstrate various aspects of the invention, and should not be construed to limit the present invention to any particular logic flow or logic implementation. The described logic may be partitioned into different logic blocks (e.g., program, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without hanging the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Away (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within a network device under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a. CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for supporting cut-through paths in an optical communication system using a communication protocol comprising:
    transmitting a protocol message including:
        a hop count extension for transporting hop count information over a communication path; and
        a quality of service extension for transporting quality of service information associated with each of a plurality of links inserted in the quality of service extension at each hop encountered in a communication path; and
    establishing a cut-through path selected based on information obtained via the protocol message, wherein a decision whether to establish an alternate cut-through path depends upon the hop count information and the quality of service information.

2. The method of claim 1, wherein the quality of service extension has a variable length.

3. The method of claim 2, wherein the variable length depends upon a type of quality of service information.

4. The method of claim 3, wherein the type of quality of service information depends upon a type of link in the communication path.

5. The method of claim 1, wherein a terminating device in the communication path is one of a bridge router or a switch node.

6. The method of claim 4, wherein a quality of service type is selected from a pool of unused type values for next hop resolution protocol (NHRP) extensions.

7. A computer readable non-transitory storage medium storing a computer-executable program that when executed:
    stores and transmits a transmission protocol message, the transmission protocol message including:
        a hop count extension for transporting hop count information over a communication path; and
        a quality of service extension for transporting quality of service information associated with each of a plurality of links inserted in the quality of service extension at each hop encountered in a communication path,
    wherein a decision whether to establish an alternate cut-through path depends upon the hop count information and the quality of service information.

8. The computer readable non-transitory medium of claim 7, wherein the quality of service extension has a variable length.

9. The computer readable non-transitory storage medium of claim 8, wherein the variable length depends upon a type of quality of service information.

10. The computer readable non-transitory storage medium of claim 9, wherein the type of quality of service information depends upon a type of link in the communication path.

11. The computer readable non-transitory medium of claim 10, wherein a quality of service type is selected from a pool of unused type values for next hop resolution protocol (NHRP) extensions.

* * * * *